Figures 1, 2, 3:
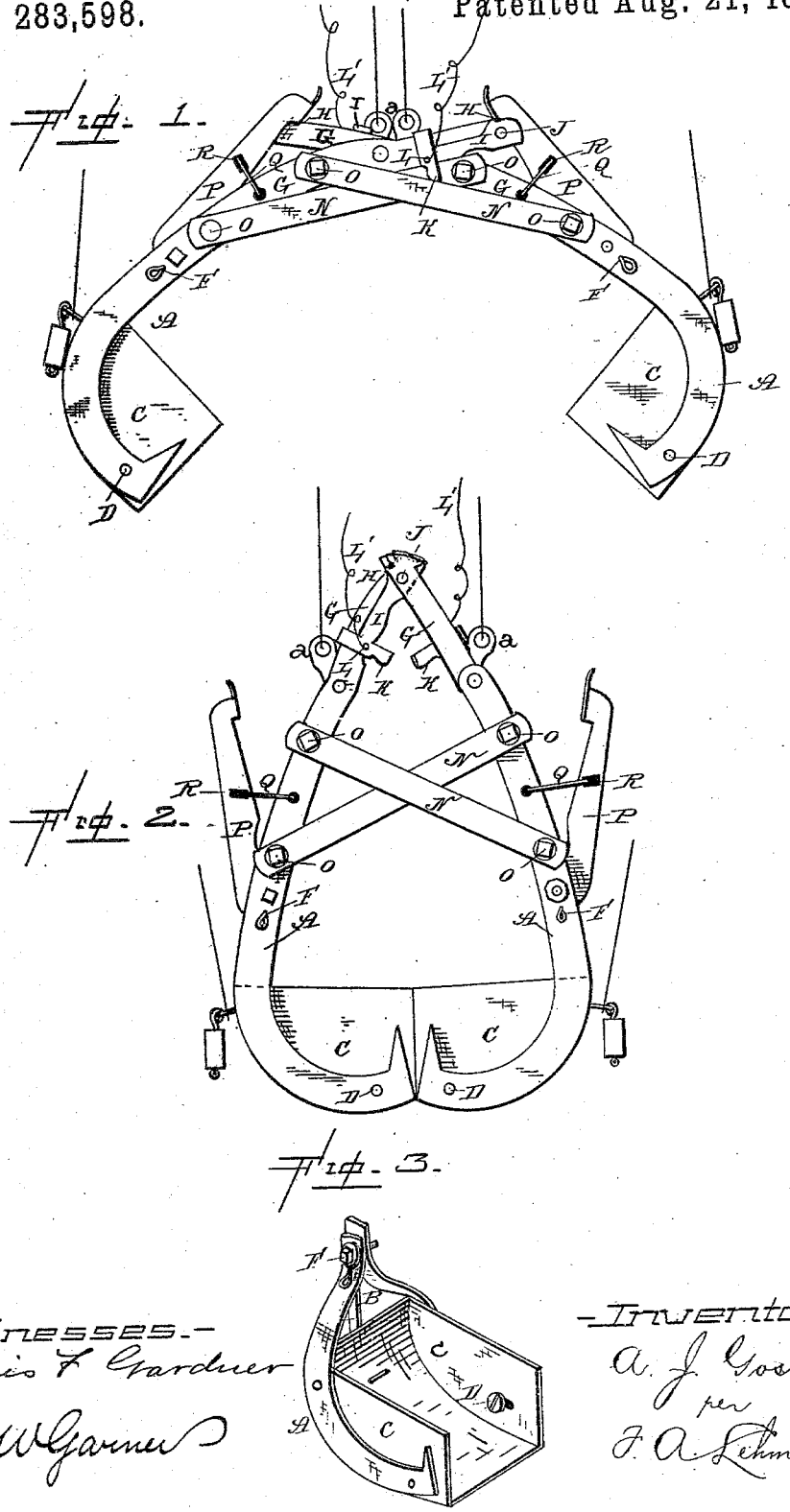

(No Model.)

A. J. GOSNELL.
DREDGING BUCKET.

No. 283,598. Patented Aug. 21, 1883.

Witnesses—
Louis F. Gardner
J. W. Garner

Inventor—
A. J. Gosnell
per
F. A. Lehmann, atty

UNITED STATES PATENT OFFICE.

ANDREW J. GOSNELL, OF TERRE HAUTE, INDIANA.

DREDGING-BUCKET.

SPECIFICATION forming part of Letters Patent No. 283,598, dated August 21, 1883.

Application filed May 17, 1883. (No model.)

*To all whom it may concern:*

Be it known that I, ANDREW J. GOSNELL, of Terre Haute, in the county of Vigo and State of Indiana, have invented certain new and useful Improvements in Dredging-Buckets; and I do hereby declare the following to be a full, clear, and exact description of the invention, such as will enable others skilled in the art to which it pertains to make and use it, reference being had to the accompanying drawings, which form part of this specification.

My invention relates to an improvement in dredging-buckets; and it consists in the combination of the hooks, removable shells, which are secured thereto, and the braces, which are secured rigidly to the shells at their lower ends and removably attached to the hooks at their upper ends, and it still further consists in the combination of the grappling-hooks having shells removably attached to their lower ends, and having suitable notched extensions attached to their upper ends, pivoted tripping levers and pawls for engaging with the notched extensions, and crossed braces, as will be more fully described hereinafter.

The object of my invention is to provide grappling-hooks which can have dredging-shells removably connected to them, whereby the hooks can be used as grappling-hooks alone, or as dredging-buckets, as may be desired.

Figure 1 is a side elevation of a machine embodying my invention, showing the hooks extended. Fig. 2 is a similar view of the same, showing the hooks closed. Fig. 3 is a perspective of the lower portion of one pair of the hooks, showing the manner of securing the shells thereto.

A represents the grappling-hooks, which are used together in pairs, their upper ends being secured closely together, while their lower ends are made to curve away from each other, as shown in Fig. 3. These lower ends are made to curve outward away from each other, for the purpose not only of allowing the hooks, when used as grappling-hooks alone, to be used to better advantage, but to receive the shell C between the lower end of each pair, as shown. These dredging-shells C will preferably be of the shape shown, and have slots cut through their sides, so as to allow the set-screws D to pass through them into the hooks. Slots are made through the shells for the purpose of allowing a slight adjustment of the shells at any time. Secured to the outer side of each shell there is a rod or brace, B, which extends upward a suitable distance, and which has its upper end secured rigidly in position between the hooks A at that point where they begin to curve outward, as shown in Fig. 3. The pin or bolt F, which is passed through the bars, and the hooks are made removable, so that it and the set-screws D can be readily removed at any time, and thus enable the shells to be detached from the hooks when the hooks are to be used as grappling-hooks alone. The upper ends of these hooks A are connected together by means of the crossed braces N, which braces assume the position shown in Fig. 1 when the hooks are opened outward and the position shown in Fig. 2 when the hooks are closed.

Rigidly secured to the upper end of each pair of hooks A is the extension G, which has a notch, H, formed in its upper edge. Pivoted between the hooks A are the pawls P, which engage with the notches H in the extension for the purpose of holding the hooks in an open position, as shown in Fig. 1.

For the purpose of detaching these pawls P from the notches in the extension when the hooks are to be closed, there is pivoted to the side of each extension a tripping device, I, to which a cord, wire, or chain, L', is attached. When it is desired to close the hooks a pull is exerted upon the wires, cords, or chains, L', when the outer ends of the tripping device will act as cams or levers to raise the ends of the pawls P, and thus trip the pawls. These pawls P are attached near their centers to the hooks A by means of the loops or hooks Q, which pass at their outer ends through the slots R which are made through the pawls. These slots R allow the pawls a sufficient amount of play without allowing them to move too far from the hooks. When the hooks are opened outward, these loops Q extend out to the outer ends of the slots; but when the hooks are closed the pawls move outward, as shown in Fig. 2, and the loops Q then hold them in position. Secured between the outer end of each pair of hooks are the plates or links $a$, into which the lifting-cords are made to catch.

Having thus described my invention, I claim—

1. In the combination of the hooks A, the removable shells C, and the braces B, the braces being rigidly secured to the shells at their lower ends and removably attached to the hooks at their upper ends, substantially as shown.

2. The combination of the hooks A, the shells C, and braces B, with the crossed braces $n$, notched extensions G, pawls P, and tripping devices I, the parts being combined and arranged to operate substantially as set forth.

In testimony whereof I affix my signature in presence of two witnesses.

ANDREW J. GOSNELL.

Witnesses:
BENJAMIN MURRAY,
ANDREW BAKER.